United States Patent
Barlsen et al.

(10) Patent No.: US 8,135,527 B2
(45) Date of Patent: Mar. 13, 2012

(54) COMMERCIAL VEHICLE TRAILER AND METHOD FOR AVOIDING ERROR IN THE STORAGE OF VEHICLE DATA THEREIN

(75) Inventors: Holger Barlsen, Langenhagen (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 548 days.

(21) Appl. No.: 12/310,265

(22) PCT Filed: Jun. 26, 2007

(86) PCT No.: PCT/EP2007/005628
§ 371 (c)(1),
(2), (4) Date: Feb. 17, 2009

(87) PCT Pub. No.: WO2008/022665
PCT Pub. Date: Feb. 28, 2008

(65) Prior Publication Data
US 2010/0017086 A1    Jan. 21, 2010

(51) Int. Cl.
*G06F 19/00*    (2011.01)
(52) U.S. Cl. ............... 701/70; 701/36; 701/83; 303/124
(58) Field of Classification Search ............... 701/36, 701/70, 71, 83; 303/124, 154
See application file for complete search history.

(56) References Cited

U.S. PATENT DOCUMENTS

| | | | |
|---|---|---|---|
| 6,195,602 | B1 | 2/2001 | Hazama et al. |
| 6,438,481 | B1 | 8/2002 | Carpenter et al. |
| 2005/0067886 | A1 | 3/2005 | Nilsson et al. |
| 2006/0033382 | A1 | 2/2006 | Steph et al. |
| 2006/0208169 | A1* | 9/2006 | Breed et al. .......... 250/221 |

FOREIGN PATENT DOCUMENTS

| | | |
|---|---|---|
| DE | 197 07 207 A1 | 8/1998 |
| FR | 2 791 432 A1 | 9/2000 |

* cited by examiner

*Primary Examiner* — Gertrude Arthur Jeanglaude
(74) *Attorney, Agent, or Firm* — Kramer Levin Naftalis & Frankel LLP

(57) ABSTRACT

A commercial vehicle trailer includes an electronically controlled braking system having an electronic control unit that has a parameter memory having one or more memory areas that can store vehicle-specific data. The electronic control unit controls the electronically controlled braking system based on the vehicle-specific data, and has an interface to an external computer. To permit reliable correlation of the vehicle-specific data to the commercial vehicle trailer, information is displayed on the trailer itself that characterizes the vehicle-specific data and that can be read into the computer via a reader unit. Based on such information, the appropriate vehicle-specific data is transferred to the electronic control unit.

24 Claims, 1 Drawing Sheet

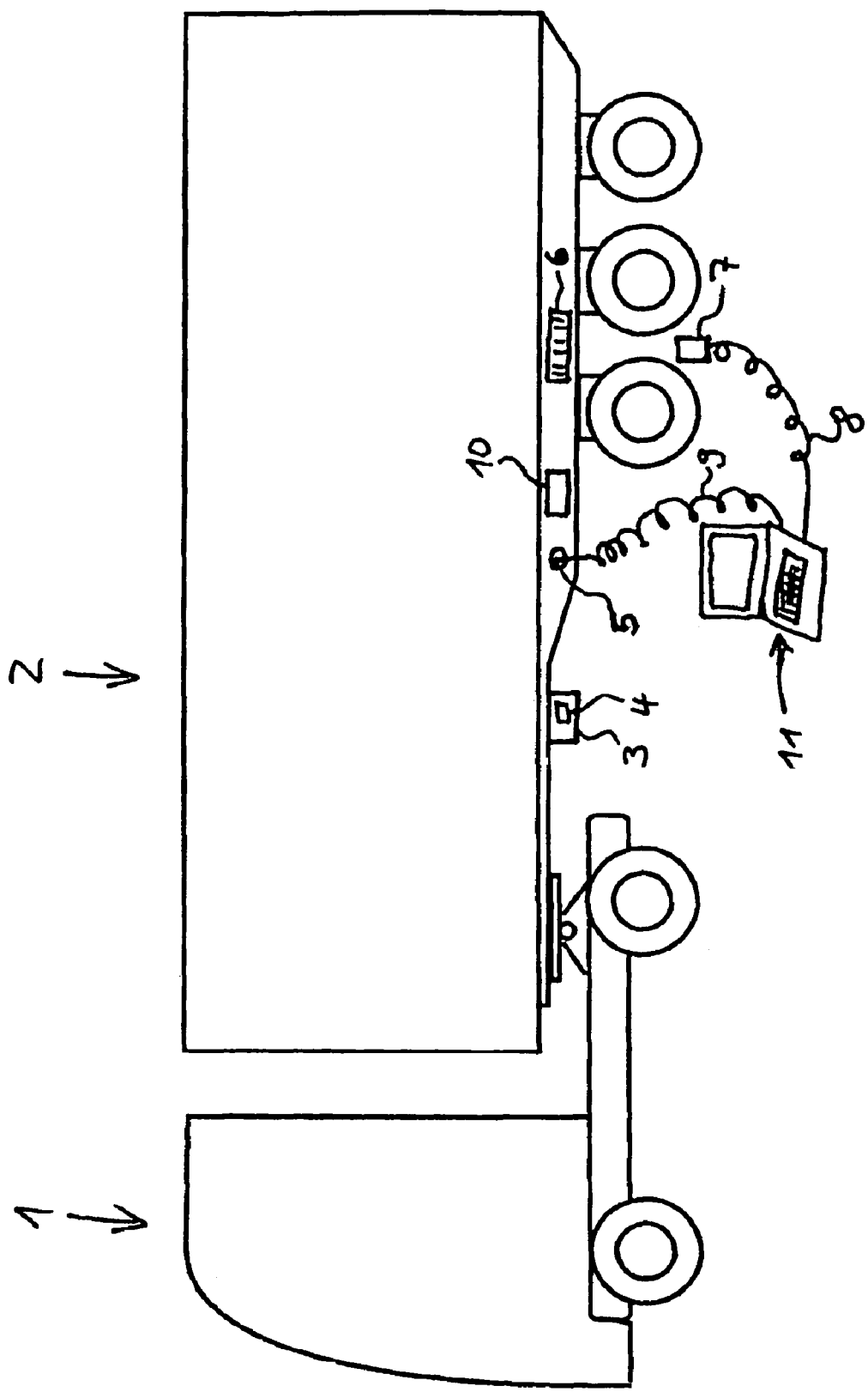

COMMERCIAL VEHICLE TRAILER AND METHOD FOR AVOIDING ERROR IN THE STORAGE OF VEHICLE DATA THEREIN

FIELD OF THE INVENTION

The present invention generally relates to a system and method for avoiding error in the storage of vehicle data in a commercial vehicle trailer having an electronically controlled braking system.

BACKGROUND OF THE INVENTION

Via a parameter memory provided in an electronic control unit, the electronically controlled brake system of a commercial vehicle trailer can be variably adjusted to specified configurations of the trailer, for example to the number of braked axles or to the presence of additional devices such as a tire-pressure monitor or a pneumatic suspension. During the manufacture, commissioning or repair of such a trailer, it is therefore necessary to store vehicle-specific data characterizing the configuration in the parameter memory, and, in this connection, it is important that data matching the trailer are selected. For this purpose, it is known that a plurality of parameter data records for various configurations of commercial vehicle trailers can be supplied on a computer and that the matching parameter data record can be selected manually and stored in the parameter memory during manufacture, commissioning or repair. In the process, an unsuitable parameter data record might inadvertently be selected, especially, if a large number of parameter data records is supplied for selection.

Further, from DE 19707207 A1, it is known that the control unit of an electronically controlled brake system can be equipped with a nonvolatile memory as well as with a port for a barcode reader. Data of correlation functions between a specified delay signal and the brake pressure to be injected can be stored by means of the barcode reader.

SUMMARY OF THE INVENTION

Generally speaking, it is an object of the present invention to make the storage of vehicle-specific data less susceptible to error during the manufacture, commissioning or repair of a commercial vehicle trailer.

In a commercial vehicle trailer including an electronically controlled braking system having an electronic control unit that has a parameter memory having one or more memory areas that can store vehicle-specific data, the electronic control unit controls the electronically controlled braking system based on the vehicle-specific data, and has an interface to an external computer. In accordance with embodiments of the present invention, information that characterizes or otherwise relates to the vehicle-specific data is provided on the commercial vehicle trailer itself to avoid operator errors and to, thus, make the operation of storing the vehicle-specific data considerably more reliable. For this purpose, the information is advantageously displayed on the commercial vehicle trailer in a way that permits reliable correlation of the vehicle-specific data to the trailer. For example, the information can be provided on a sticker or a plate or the like mounted temporarily or permanently on the trailer. Temporary mounting is particularly advantageous when the information is needed only during the manufacturing operation or during the commissioning of the commercial vehicle trailer by the manufacturer after the manufacturing operation. In such case, the information can be removed after completion of the manufacturing operation or of commissioning.

If the information is also needed during subsequent operation of the commercial vehicle trailer, such as for repair purposes, for example, it is advantageous to mount the information on the trailer in a way that prevents or at least greatly hampers manipulation or replacement. As an example, this can be achieved by mounting the information on the commercial vehicle trailer with fasteners, such as, for example, rivets, which cannot be readily detached. Mounting of the information with clip fasteners or by welding is also advantageous.

The information can be mounted advantageously on the frame or rear end of the commercial vehicle trailer, for example in the vicinity of operator control elements for the pneumatic suspension or the parking brake of the trailer.

It will be appreciated that, in contrast to DE 19707207 A1, in which the control unit of an electrically controllable brake system must be expanded by a port for a barcode reader as well as by the operating software necessary for operation, the present invention can, advantageously, be used even with existing control units, without the need for modification thereof.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the constructions herein set forth, and the scope of the invention will be indicated in the claims.

BRIEF DESCRIPTION OF THE DRAWINGS

For a fuller understanding of the invention, reference is had to the following description taken in connection with the accompanying drawing in which:

FIG. 1 is a schematic diagram of a vehicle train including a tractor and a commercial vehicle trailer in accordance with an embodiment of the present invention.

DETAILED DESCRIPTION OF THE PREFERRED EMBODIMENTS

Referring to FIG. 1, commercial vehicle trailer (2) is equipped with an electronically controlled brake system, of which an electronic control unit (3) is used to control the brake system. Electronic control unit (3) is provided with a parameter memory (4), which has at least one memory area in which vehicle-specific data can be stored. Examples of vehicle-specific data include setting parameters of the electronically controlled brake system, such as, for example, the configuration of the commercial vehicle trailer, the number of braked axles, a braking-force distribution function or control of additional functions, such as, for example, a lift axle. Such vehicle-specific data are used by electronic control unit (3) to control the brake function and possible additional functions of the trailer.

Electronic control unit (3) has an interface to an external computer. In the exemplary embodiment shown in FIG. 1, the interface is depicted as an electrical plug-in port (5) that is connected via an electrical line to electronic control unit (3). An external computer (11) is connected to plug connector (5) via an electrical line (9). External computer (11) can be, for example, a personal computer (e.g., a laptop computer). It can also be a diagnostic unit for vehicle diagnosis. An application software program as well as a plurality of parameter data records for various configurations of commercial vehicle trailers is stored in computer (11). The application software enables manual selection, from the plurality of parameter data records, the parameter data record that is suitable for commercial vehicle trailer (2) and contains vehicle-specific data suitable for trailer (2). Via line (9) as well as the interface, the selected data can be stored in parameter memory (4) of electronic control unit (3).

Computer (11) is further adapted for connection of a reader unit (7), which, in FIG. 1, is shown connected to computer (11) via an electrical line (8). Reader unit (7) is designed to read information from an information access medium (6) provided on commercial vehicle trailer (2). Information access medium (6) includes information that characterizes the vehicle-specific data of commercial vehicle trailer (2). As an example, information access medium (6) can be provided on a sticker or plate (e.g., metal plate) or the like. Information access medium (6) can advantageously contain optically readable information, especially via a barcode or clear text information, such as, for example, the chassis number of commercial vehicle trailer (2). In such case, the reader unit is advantageously designed as a barcode reader or as a scanner.

Information access medium (6) can also be provided with a memory device, e.g., a memory chip, that can be contacted by wire bonding. In such case, reader unit (7) is equipped with corresponding terminal contacts for electrical contact with the memory device.

Information access medium (6) can also be provided with a memory device that is readable by radio signal, especially an RFID (Remote Frequency Identification) chip. In such case, reader unit (7) is equipped with an RFID detector.

Also, the information and memory device can advantageously be combined into one information access medium (6). In a further embodiment, information access medium (6) includes a plurality of partial information access media mounted at different locations of commercial vehicle trailer (2), such as, for example, a plaque containing the chassis number as well as a sticker containing barcode information.

Furthermore, commercial vehicle trailer (2) is equipped with an operator control device (10), by means of which the various functions of the trailer (2), such as, for example, the level adjustment, can be manually influenced. To ensure data exchange, operator control device (10) is connected via electrical connections to electronic control unit (3) as well as to further control units that may be present in commercial vehicle trailer (2).

The application software provided in computer (11) advantageously embodies an inventive process for storing, in parameter memory (4) of electronic control unit (3), vehicle-specific data of the commercial vehicle trailer described above. The process includes the steps of: a) reading into computer (11), by means of a reader unit (7) connected to computer (11), information from at least one information access medium (6) mounted on commercial vehicle trailer (2), b) determining the vehicle-specific data on the basis of the information read by computer (11), c) transferring the vehicle-specific data from computer (11) to electronic control unit (3) via an interface, and d) storing in electronic control unit (3) the vehicle-specific data in parameter memory (4).

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A commercial vehicle trailer, comprising:
an electronically controlled brake system having an electronic control unit, said electronic control unit including:
a parameter memory having at least one memory area for storing vehicle-specific data; and
an interface to an external computer, said electronic control unit being configured to control said electronically controlled brake system based at least in part on said vehicle-specific data; and
at least one information medium provided on said commercial vehicle trailer, said at least one information medium storing information associated with said vehicle-specific data.

2. The commercial vehicle trailer according to claim 1, wherein said vehicle-specific data are transferred into said parameter memory from said computer via said interface.

3. The commercial vehicle trailer according to claim 1, wherein said at least one information medium stores a reference to a parameter data record specific to said commercial vehicle trailer, said parameter data record including said vehicle-specific data.

4. The commercial vehicle trailer according to according to claim 3, wherein said parameter data record specific to said commercial vehicle trailer is automatically selected from a plurality of parameter data records stored on said computer based on said reference and transferred into said parameter memory.

5. The commercial vehicle trailer according to claim 4, wherein said reference includes a chassis number of said commercial vehicle trailer.

6. The commercial vehicle trailer according to claim 1, wherein said at least one information medium stores said vehicle-specific data.

7. The commercial vehicle trailer according to claim 1, wherein said at least one information medium is a metal plate.

8. The commercial vehicle trailer according to claim 1, wherein said at least one information medium is a sticker.

9. The commercial vehicle trailer according to claim 1, wherein said at least one information medium includes optically readable information.

10. The commercial vehicle trailer according to claim 1, wherein said at least one information medium includes a memory device, said memory device being constructed and arranged to be contacted by wire bonding.

11. The commercial vehicle trailer according to claim 1, wherein said at least one information medium includes a memory device, said memory device being readable by radio signal.

12. The commercial vehicle trailer according to claim 1, wherein said at least one information medium stores a parameter data record identifier.

13. The commercial vehicle trailer according to claim 1, wherein said at least one information medium includes a trailer-specific identifier.

14. The commercial vehicle trailer according to claim 1, wherein said at least one information medium includes a chassis number of said commercial vehicle trailer.

15. The commercial vehicle trailer according to claim 9, wherein said optically readable information is at least one of a barcode and clear text information.

16. The commercial vehicle trailer according to claim 10, wherein said memory device is a memory chip.

17. The commercial vehicle trailer according to claim 11, wherein said memory device is an RFID chip.

18. A computer, comprising:
a first connection to an interface of a commercial vehicle trailer; and
a second connection to a reader unit, said computer being suitably programmed to effect the steps of:
reading information associated with vehicle-specific data from at least one information medium provided on said commercial vehicle trailer using said reader unit;
determining said vehicle-specific data based on said information associated with said vehicle-specific data;
transferring said vehicle-specific data from said computer to said electronic control unit via said interface; and
storing said vehicle-specific data in said parameter memory of said electronic control unit.

19. In a commercial vehicle trailer comprising:
an electronically controlled brake system having an electronic control unit, said electronic control unit including:
a parameter memory having at least one memory area for storing vehicle-specific data; and
an interface to an external computer, said electronic control unit being configured to control said electronically controlled brake system based at least in part on said vehicle-specific data; and
at least one information medium provided on said commercial vehicle trailer, said at least one information medium storing information associated with said vehicle-specific data;
a method for storing vehicle-specific data comprising the steps of:
using a reader unit connected to a computer, reading into said computer information associated with said vehicle-specific data from said at least one information medium provided on said commercial vehicle trailer;
determining said vehicle-specific data based on said information associated with said vehicle-specific data;
transferring said vehicle-specific data from said computer to an electronic control unit of an electronically controlled brake system of said commercial vehicle trailer via an interface; and
storing said vehicle-specific data in parameter memory of said electronic control unit.

20. A computer program product comprising a computer usable physical medium storing a computer executable program to effect a method according to claim 19.

21. The method according to claim 19, wherein said at least one information medium stores a reference to a parameter data record specific to said commercial vehicle trailer, said parameter data record including said vehicle-specific data.

22. The method according to claim 21, wherein said parameter data record specific to said commercial vehicle trailer is automatically selected from a plurality of parameter data records stored on said computer based on said reference and transferred into said parameter memory.

23. The method according to claim 21, wherein said reference includes a chassis number of said commercial vehicle trailer.

24. A method for storing vehicle data in a commercial vehicle trailer, the method comprising the steps of:
using a reader unit connected to a computer, reading into said computer information associated with vehicle-specific data from at least one information medium provided on said commercial vehicle trailer;
determining said vehicle-specific data based on said information associated with the vehicle-specific data;
transferring said vehicle-specific data from said computer to an electronic control unit of an electronically controlled brake system of said commercial vehicle trailer via an interface; and
storing said vehicle-specific data in parameter memory of said electronic control unit.

* * * * *